Nov. 8, 1927. 1,648,659

E. H. PERCY

POWER OPERATED HOOK DOG

Filed April 22, 1926

INVENTOR.
Edwin H. Percy.
BY Townsend, Loftus & Abbott
ATTORNEYS.

Patented Nov. 8, 1927.

1,648,659

UNITED STATES PATENT OFFICE.

EDWIN H. PERCY, OF FORT BRAGG, CALIFORNIA, ASSIGNOR TO PERCY ELECTRIC DOG, INC., OF FORT BRAGG, CALIFORNIA, A CORPORATION OF CALIFORNIA.

POWER-OPERATED HOOK DOG.

Application filed April 22, 1926. Serial No. 103,740.

This invention relates to power-operated hook dogs for saw-mill carriages.

In my prior application, Serial Number 684,104, filed January 3, 1924, I show a hook dog hingedly mounted on an arm, which arm is rigidly connected to a spur gear.

The extent of the hinged movement is limited in both directions by stops or lugs which contact with the rim of the gear. Power means, such as a reversible motor, drives the gear, and thereby the hook dog is raised and lowered, the hinged connection serving to impart an inward pull to the dog after it strikes the log, so as to pull the latter against the knee.

The present invention has for its object to simplify and improve the construction and operation of a hook dog of this general type, one feature of special importance being the provision of novel eccentric means between the driving gear and the dog, whereby to prevent the log from rolling away from the knee through the tendency of the driving gear to turn backwardly under the force of the strains imposed thereon. Further novel features are the provision of a frictional mounting for the driving gear, so that it may continue to rotate after the dog is imbedded in the log; also the use of worm gearing which will tend to act as a lock to prevent backing up of the gears when the dog is in the log and the power is shut off. Other novel and advantageous features will become apparent upon a further understanding of the invention, one form of which is illustrated in the accompanying drawing, wherein Fig. 1 shows a vertical sectional view of a power-operated hook dog embodying my invention;

Figure 2:
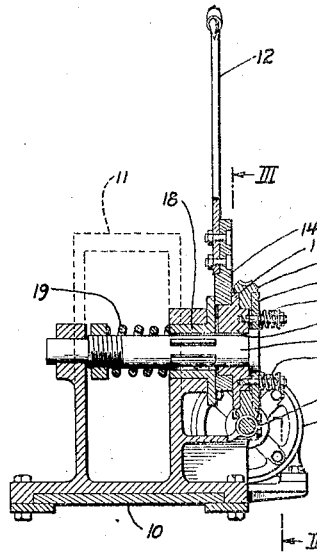
Fig. 2 shows a cross-section taken on the line II—II of Fig. 1.

Referring in detail to the accompanying drawing, 10 indicates the head block of a saw-mill carriage, upon which is slidably mounted a knee frame 11, carrying a hook dog 12 and its actuating mechanism. The said hook dog is provided with a hub portion 14 journaled upon a disk 15 eccentrically mounted on a shaft 16. At one side the hub abuts against a flange 17 on the eccentric disk, and at the opposite side of the hub is a plate 18 splined upon the shaft 16 and pressed against the hub by a spring 19. Thereby the hub is frictionally held against turning with respect to the eccentric disk. To positively limit the turning movement of the hub with respect to the eccentric disc, the latter is formed with a lug 20 co-operating with shoulders 21 spaced on the rim of the hub about 180 degrees apart.

For driving the eccentric there is mounted on the outer end thereof a worm gear 23, which gear is frictionally held against the said eccentric disc by means of a plate 24 bolted on to the said eccentric disc and pressed against the face of the worm gear by springs 25. A screw 26 on a horizontal shaft meshes with the said worm gear and this screw shaft is connected by means of a universal coupling 27 to a motor 28. The motor as shown in the present instance is a reversible electric motor, but may be any other type of power appliance capable of rotating the said shaft in either direction.

Figure 1:
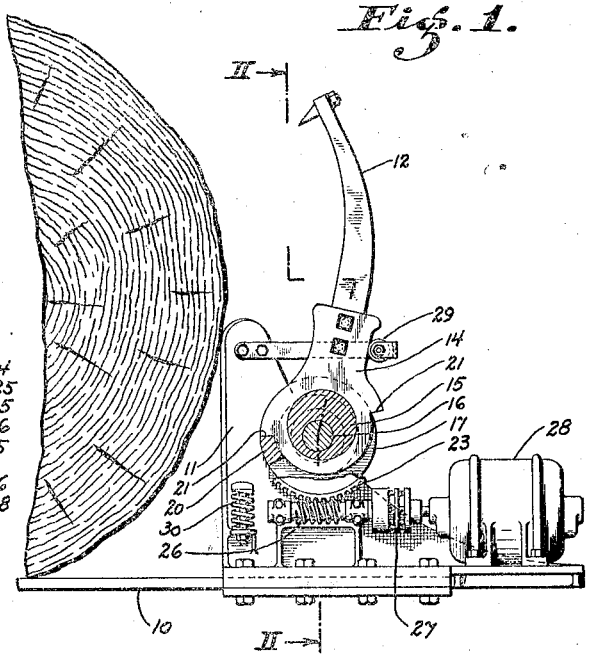
Figure 3:
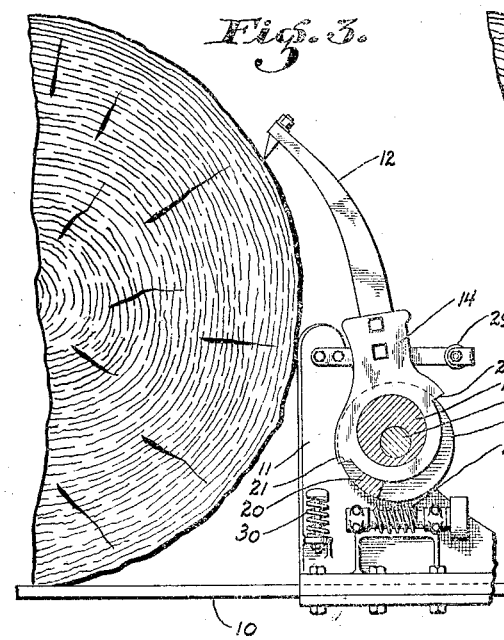
Fig. 3 shows a section taken on the line III—III of Fig. 2, illustrating the dog in position where it meets the log.
Figure 4:
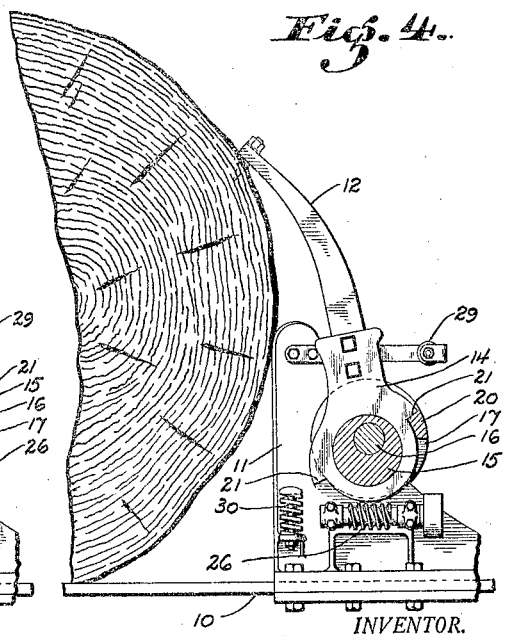
Fig. 4 shows a view similar to Fig. 3, with the dog driven home into the log.

The normal inoperative position of the hook dog is that shown in Fig. 1, where the said dog is in vertical position, resting against a stop 29, and the lug 20 on the eccentric disc is engaged with the shoulder 21 at the left. The motor, through the gearing, will turn the eccentric disc to the left, and the frictional connection between the eccentric disc and the hub will cause the dog to swing downwardly until its point strikes the log, as shown in Fig. 3. At this time the dog will cease swinging and the eccentric will continue to turn, until finally the lug 20 strikes the shoulder at the right of the hub, as indicated in Fig. 4. Thereby the high point on the eccentric will have moved from a position pointing upwardly to a position pointing downwardly, thus carrying the point of the dog downwardly and inwardly towards the knee. This will insure that the log is tightly gripped and drawn closely against the knee. The lug 20, upon striking the shoulder at the right, will have the effect of imbedding the point of the dog securely into the log. The friction connection between the worm gear and the eccentric disc will allow the motor to continue to turn after the dog is finally driven home, and thus the motor may come to a gradual stop without serious shocks. In the final position of the dog, as shown in Fig. 4, the high point of the eccentric is substantially on a line with the point of the dog, and the axis of the eccentric, so that any pull applied to the point of the dog, due to the tendency of the dog to roll away from the knee, will be firmly resisted, and no tendency will occur for the eccentric to back up. Likewise, the eccentric will be frictionally held against turning by the worm gear, which gear in turn will be positively held against backing up, by virtue of its engagement with the screw.

When it is desired to release the dog, the motor is reversed, whereupon the eccentric turns to the right, thus lifting the point of the dog out of the log. Once the point is free from the log the arm will swing upwardly with the eccentric, until it strikes the stop 29, whereupon the eccentric will continue to rotate until stopped by contact of the lug 20 with the shoulder on the left side of the hub. In this position the parts are restored to normal inoperative position, with the high point of the eccentric pointing upwardly.

To prevent injury to the mechanism in case the dog should be operated by accident when there is no log on the carriage, I provide a spring buffer 30 near the front of the knee in position to be engaged by the hub of the dog before the point strikes the head block.

Various changes in the construction and arrangement of the several parts herein shown and described may be employed without departing from the spirit of my invention, as disclosed in the appended claims.

Having thus described my invention, what I claim as new and desire to secure by Letters Patent is:

1. In a saw-mill carriage, a knee, a hook dog, and eccentric means for actuating the dog so as to impart thereto first a swinging movement towards the log and then a movement bodily downwardly and towards the knee, and a rotatable motor for driving the eccentric means in either direction, whereby to engage and disengage the dog with a log.

2. In a saw-mill carriage, a knee, a hook dog, said hook dog having a hub portion, an eccentric disc on which the hub portion is mounted, means for rotating the eccentric disc, and connections between the latter and the hub portion, whereby the dog will be caused to swing towards the log until it strikes the same, and thereafter will be moved bodily downwardly and towards the knee, and a rotatable motor for driving said eccentric disc in either direction, whereby to engage and disengage the dog with a log.

3. In a saw-mill carriage, a knee, a hook dog having a hub portion, an eccentric disc on which said hub portion is mounted, means for rotating the eccentric disc, and frictional and positive connections between the said eccentric disc and hub portion whereby the high point of the eccentric disc will be extended upwardly when the dog is out of the log, and when the dog is engaged with the log such high point of the eccentric disc will be disposed on the opposite side of the axis of said disc and substantially in line with the point of the dog.

4. In a saw-mill carriage, a knee, a hook dog having a hub portion, an eccentric disc on which the said hub portion is mounted, frictional members connecting the hub portion with the disc, and spaced members forming positive stops between the disc and hub, whereby when the dog strikes a log the eccentric disc may turn relatively a limited distance to pull the dog downwardly and towards the knee, and may also turn relatively in the opposite direction to disengage the point of the dog from the log before the stop becomes effective.

5. In a saw-mill carriage, a knee, a hook dog, means for actuating the dog so as to impart thereto first a swinging movement towards the log and then a bodily movement downwardly and towards the knee, and a gear frictionally connected to said actuating means for operating the latter, and power-operated means for driving the said gear, whereby when the dog is finally stopped by its engagement with the log said frictional connections will permit the power-operated mechanism to continue to move.

6. In a saw-mill carriage, a knee, a hook dog, means for actuating the hook dog so as to swing the same towards the log and then to draw it inwardly towards the knee, a worm gear for driving said actuating means, a screw engaging the worm gear, and a reversible motor for operating the screw.

7. In a saw-mill carriage, a knee frame, a shaft journaled thereon, an eccentric disc fixed to said shaft, a hook dog carried by the eccentric disc, a gear frictionally connected with the eccentric disc, and power-operated means for driving said gear in either direction.

EDWIN H. PERCY.